United States Patent [19]

Fellenbaum

[11] Patent Number: 4,786,104
[45] Date of Patent: Nov. 22, 1988

[54] BICYCLE SEAT COVER ASSEMBLY WITH TRIANGULAR ELASTIC UNDER FLAP MEMBERS

[76] Inventor: Ernest S. Fellenbaum, 4121 W. Jefferson Blvd., Los Angeles, Calif. 90016

[21] Appl. No.: 172,567

[22] Filed: Mar. 24, 1988

[51] Int. Cl.⁴ .............................................. B62J 1/00
[52] U.S. Cl. .................................. 297/224; 297/195; 297/214
[58] Field of Search ................ 297/224, 195, 214, 219

[56] References Cited

U.S. PATENT DOCUMENTS

| | | | |
|---|---|---|---|
| 2,729,278 | 1/1956 | Waranch | 297/224 |
| 4,451,083 | 5/1984 | Marchello | 297/195 |

FOREIGN PATENT DOCUMENTS 1275736  5/1972  United Kingdom ............... 297/224

*Primary Examiner*—James T. McCall
*Attorney, Agent, or Firm*—Gene W. Arant; Matthew F. Jodziewicz

[57] ABSTRACT

The invention relates to a bicycle seat cover assembly having a seat cover with an exterior trim member extending about its periphery, front and rear under flap members supported from the exterior trim member and adapted to pass underneath the respective ends of a bicycle seat for securing the set cover assembly thereto, and an adjusting strap disposed intermediate to the front and rear under flap members for adjusting and tightening the securing action.

According to the invention the rear under flap member is of generally crescent-shaped configuration but cut off at its forward corners, and the missing corner are then replaced with a pair of essentially triangular, highly elastic members. These members make it easier to install or remove the seat cover assembly, and also increase its useful life.

3 Claims, 2 Drawing Sheets

BICYCLE SEAT COVER ASSEMBLY WITH TRIANGULAR ELASTIC UNDER FLAP MEMBERS

BACKGROUND OF THE INVENTION

The present invention is an improvement on the bicycle seat cover assembly shown in my copending United States patent application which is soon to be issued as U.S. Pat. No. 4,733,907.

The object and purpose of the invention is to provide an improved bicycle seat cover assembly which will be even easier than previously known seat covers to install upon or remove from a bicycle seat, and which will also resist damage and have a long useful life.

SUMMARY OF THE INVENTION

The invention relates to a bicycle seat cover assembly having a seat cover with an exterior trim member extending about its periphery, front and rear under flap members supported from the exterior trim member and adapted to pass underneath the respective ends of a bicycle seat for securing the seat cover assembly thereto, and an adjusting strap disposed intermediate to the front and rear under flap members for adjusting and tightening the securing action.

According to the invention the rear under flap member is of generally crescent-shaped configuration but cut off at its forward corners to provide truncated forward ends. A pair of essentially triangular, highly elastic members are positioned between the exterior trim member and respective truncated ends of the rear under flap member. Each of the triangular elastic members has one edge secured to the exterior trim member, another edge secured to the associated truncated end of the back under flap member, and its remaining edge being longitudinally stretchable and effectively providing a hinged support for the associated truncated end of the back under flap member.

In use, when the seat cover assembly is installed, the elastic members effectively increase the lateral length of the forward edge of the back under flap member and thereby protect the back under flap member from being damaged.

In the preferred form of the invention the rear under flap member has associated with it a back strap extending along and secured to the concavely curved forward edge of the back under flap member, and having its ends secured to respective ones of the triangular elastic members.

DRAWING SUMMARY

Reference is now made to the drawings wherein.

DESCRIPTION OF PREFERRED EMBODIMENT
(FIGS. 1-8)

Figure 1:
FIG. 1 is a perspective view of a bicycle seat without a cover.
Figure 2:
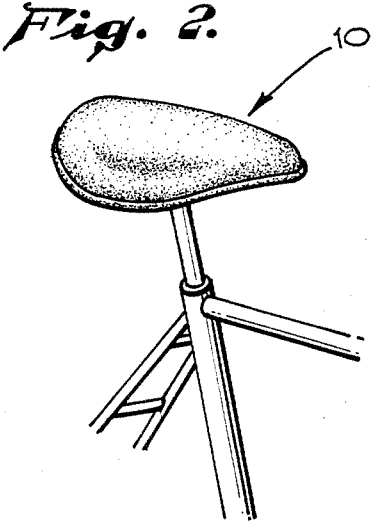
FIG. 2 is a perspective view of the same seat when covered by the cover assembly of the present invention.
Figure 3:
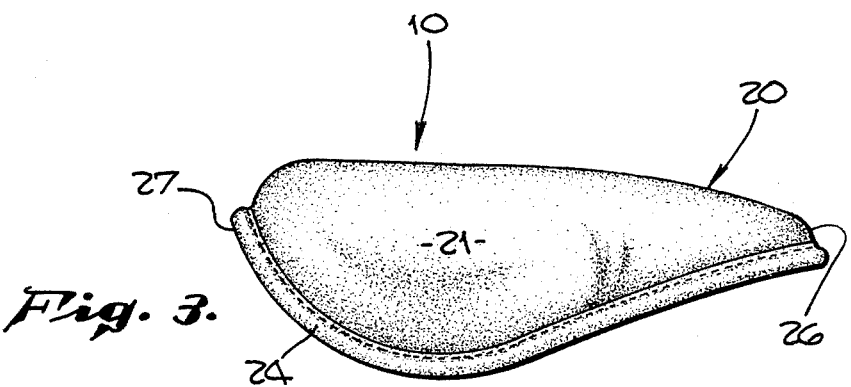
FIG. 3 is an enlarged side view of the seat cover assembly by itself.
Figure 4:
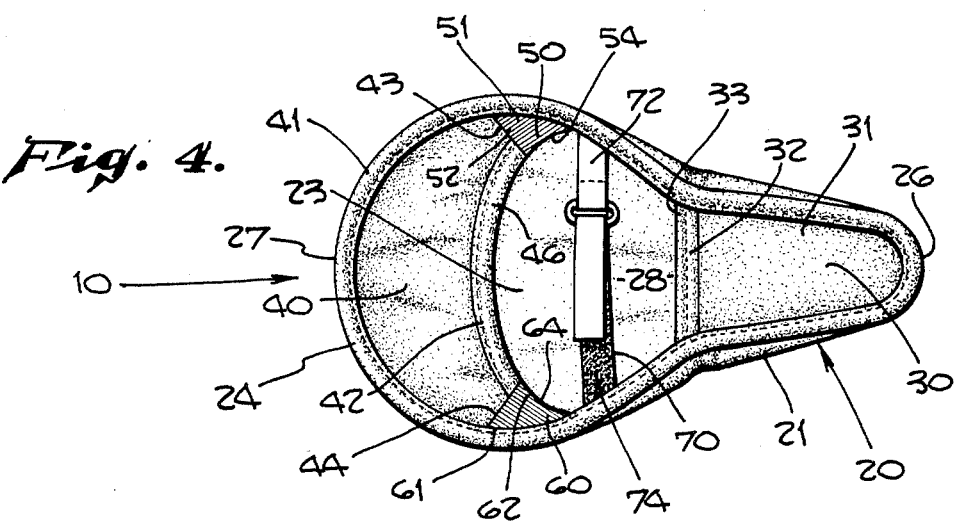
FIG. 4 is a bottom plan view of the seat cover assembly.
Figure 5:
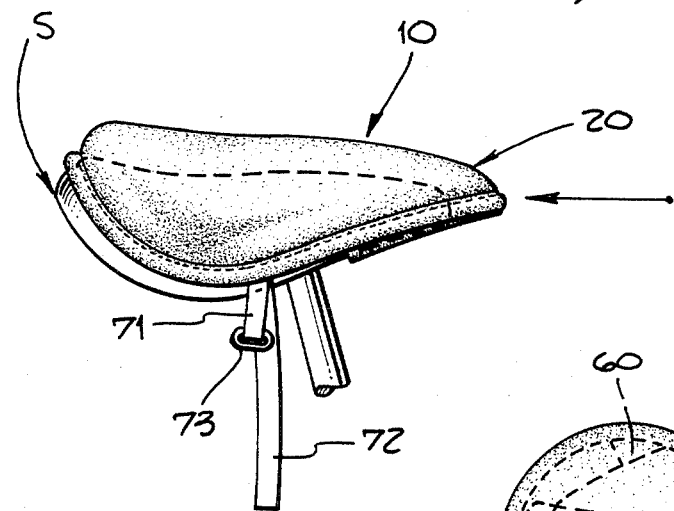
FIG. 5 is a perspective view of the seat cover assembly of the invention as it is about to be installed onto a seat.
Figure 7:
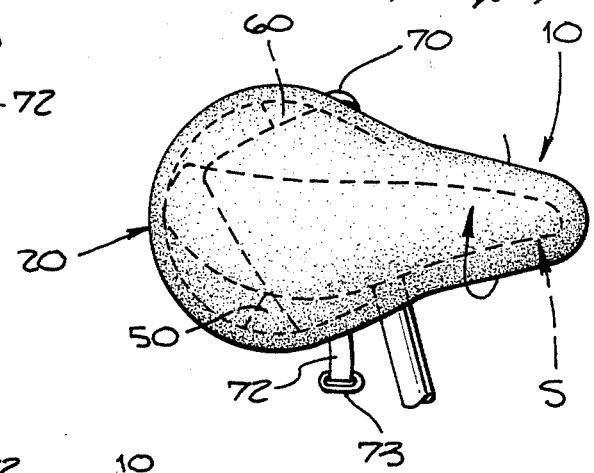
FIG. 7 shows still a further installation step.
Figure 6:
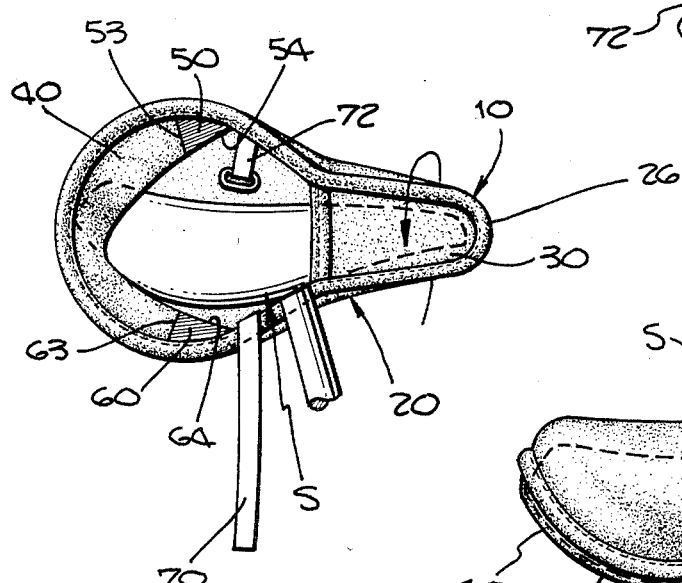
FIG. 6 shows the next step of the installation process.
Figure 8:
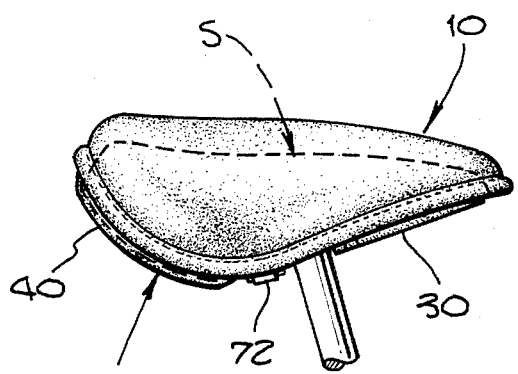
FIG. 8 shows the seat cover assembly when fully installed, with the underlying bicycle seat being shown in dotted lines.

Referring now to the drawings, a bicycle seat S shown in FIG. 1 is adapted to receive the seat cover assembly 10 of the present invention. Seat cover assembly 10 includes a seat cover 20, a front under flap member 30, a back or rear under flap member 40, a pair of triangular elastic members 50 and 60, and an adjusting strap 70.

Seat cover 20 has a top cover liner 21 which is tightly stretched over an interior cushion member, not specifically shown. A bottom cover liner 23 is stretched on the under side of the seat cover 20. An exterior trim member 24 extends about the entire periphery of the seat cover 20 and holds the top liner 21 and bottom liner 23 together.

The forward portion of seat cover 20 is tongue-shaped, and the forward extremity 26 is rounded in the horizontal plane. The rearward extremity 27 is likewise rounded in the horizontal plane. The entire seat cover 20 is transversely bent throughout its length, so that its under surface 28 is concave.

Front under flap member 30 has a peripheral edge 31 which is secured along the forward portion of exterior trim member 24. It also has a rearward edge 32 which extends transversely of the seat cover. An under trim member 33 extends along and is secured to the rearward edge 32 of flap member 30, the ends of under trim member 33 also being secured to exterior trim member 24.

The front under flap member 30 and its associated under trim member 33 are in tension, and they perform the function of maintaining the transverse bend in seat cover 20. Thus, under flap member 30 maintains a flat configuration, extending between two adjacent portions of exterior trim member 24 in a generally horizontal direction (in the operative position of the seat cover assembly).

Back under flap member 40 is generally crescent-shaped and has a convex rearward edge 41. Its forward edge 42 is concavely shaped. Although the true crescent would have pointed ends where the convex and concave curves meet, in under flap member 40 those ends are cut off. The result is truncated ends 43, 44 which extend at an angle of about 40 or 45 degrees relative to the under trim member 33.

Highly elastic triangular members 50, 60, fill the spaces that would otherwise be left vacant by the cutting off of the corners of the crescent. Thus, exterior edges 51, 61 of the triangular members are secured to exterior trim member 24; interior edges 52, 62, are secured to corresponding truncated ends 43, 44, of the rear under flap member 40; and seams 53, 63, fasten the interior edges 52, 62, not only to the flap member 40 but also to the corresponding ends of back strap 46. At the same time, outwardly exposed edges 54, 64, are effectively extensions of the back strap 46 and are stretchable longitudinally so as to effectively provide a hinged support for the associated truncated end of the back under flap member.

The back under flap member 40 normally lies loosely against the concave under surface 28 of seat cover 20.

Adjusting strap 70 has two end portions 71, 72. A ring 73 is attached to end portion 71. The other end portion 72 has a hook and pile VELCRO construction 74 which permits it to be pulled through the ring, then fastened upon itself. Thus, adjusting strap is used to adjust the position of seat cover 20 in a precise manner and then to tightly secure it there.

While the invention has been disclosed in considerable detail in one of its forms, it will be understood that this full disclosure has been made in order to comply with the patent laws, and should not be understood as limiting the scope of the invention, which is defined only by the following claims:

I claim:

1. A bicycle seat cover assembly which is configured for rider comfort as well as for ease of installation and use, comprising:
    a seat cover of a generally flat triangular configuration narrowed to a tongue at its forward end and having both its forward and rearward extremities smoothly curved in a horizontal plane, including a cushion member, a top cover liner pulled tightly over said cushion member, a bottom cover liner adapted to engage the bicycle seat, and an exterior trim member extending about the entire periphery of said seat cover and attached to both said top cover liner and said bottom cover liner;
    a front under flap member extending horizontally beneath said tongue portion of said seat cover with its peripheral edge secured to said exterior trim member, and having an under trim member secured along its rearward edge, the ends of said under trim member also being secured to said exterior trim member;
    said seat cover being transversely bent throughout its length so as to be concave on its under surface, and said front under flap member together with said under trim member being in tension for maintaining said seat cover in its transversely bent condition;
    a crescent-shaped back under flap member extending transversely beneath the rearward end portion of said seat cover with its convexly curved rearward edge secured to said exterior trim member, said back under flap member normally lying loosely against said concave under surface of said seat cover, said back under flap member having its forward corners cut off to provide truncated ends, and having a back strap extending transversely of said seat cover and secured to said back under flap member along the concavely curved forward edge thereof;
    a pair of essentially triangular, highly elastic members disposed between said exterior trim member and respective truncated ends of said back under flap member, each of said triangular elastic members having one edge thereof secured to said exterior trim member and another edge thereof secured both to the associated truncated end of said back under flap member and to the associated end of said back strap, the remaining edge of each triangular elastic member being longitudinally stretchable so as to effectively provide a hinged support for the associated truncated end of said back under flap member;
    said seat cover assembly being installed upon a bicycle seat by first placing said front under flap member underneath the tongue of the bicycle seat;
    said back under flap member being adapted to be placed underneath the rearward end portion of the bicycle seat, whereupon said triangular elastic members are stretched to allow a hinged movement of the truncated ends of said back under flap member relative to said exterior trim member; and
    an adjusting strap disposed intermediate to said under trim member and said back strap, having respective end portions secured to said exterior trim member at respective sides of said seat cover assembly, a ring attached to one of its end portions, and its other end portion being of a hook and pile construction and being adapted to be pulled through said ring and fastened to itself in order to finely adjust the securing action of said adjusting strap.

2. In a bicycle seat cover assembly having a seat cover with an exterior trim member extending about its periphery, front and rear under flap members supported from said exterior trim member and adapted to pass underneath the respective ends of a bicycle seat for securing said seat cover assembly thereto, and an adjusting strap disposed intermediate to said front and rear under flap members for adjusting and tightening the securing action, the improvement comprising:
    said rear under flap member being of generally crescent-shaped configuration but cut off at its forward corners to provide truncated forward ends; and
    a pair of essentially triangular, highly elastic members disposed between said exterior trim member and respective truncated ends of said back under flap member, each of said triangular elastic members having one edge thereof secured to said exterior trim member and another edge thereof secured to the associated truncated end of said back under flap member, the remaining edge of each triangular elastic member being longitudinally stretchable and effectively providing a hinged support for the associated truncated end of said back under flap member so that when the seat cover assembly is installed said elastic members effectively increase the lateral length of the forward edge of said back under flap member and thereby protect said back under flap member from being damaged.

3. The bicycle seat cover assembly of claim 2 which further includes a back strap extending along and secured to the concavely curved forward edge of said back under flap member and having its ends secured to respective ones of said triangular elastic members.

* * * * *